United States Patent [19]
Green

[11] 3,761,722
[45] Sept. 25, 1973

[54] TIRE INSPECTION APPARATUS
[75] Inventor: Donald T. Green, Shaker Heights, Ohio
[73] Assignee: Picker Corporation, Cleveland, Ohio
[22] Filed: Aug. 18, 1971
[21] Appl. No.: 172,741

[52] U.S. Cl............250/490, 250/83.3 D, 250/90
[51] Int. Cl. ............................................. H01j 35/16
[58] Field of Search..................... 250/52, 90, 83.30, 250/105, 53, 65, 87, 89, 91, 92; 73/146; 313/55

[56] References Cited
UNITED STATES PATENTS

| | | | |
|---|---|---|---|
| 3,621,247 | 11/1971 | Lide | 250/90 |
| 3,550,443 | 12/1970 | Sherkin | 250/83.3 D |
| 3,116,416 | 12/1963 | Reed | 250/52 |
| 3,119,019 | 1/1964 | Henry | 250/52 |
| 3,614,432 | 10/1971 | Green | 250/105 |

Primary Examiner—James W. Lawrence
Assistant Examiner—D. C. Nelms
Attorney—Watts et al.

[57] ABSTRACT

A tire inspection system is disclosed which includes a tire manipulator, an X-ray imaging system and an X-ray source apparatus for directing X-rays through a tire being inspected to the imaging system. The X-ray source apparatus includes a wide-angle X-ray tube surrounded by a movable window member. The window member enables relatively narrow beams of X-rays to be directed through the tire at desired locations. A manipulatable X-ray tube supporting apparatus is provided which includes a projecting member for supporting a two-part X-ray tube housing. One tube housing member is adjustably positionable so that the projecting support member and the X-ray tube can coextend with each other thereby enabling insertion of the tube through the rim of a relatively small tire without interference between the tire rim and the tube support member.

7 Claims, 5 Drawing Figures

PATENTED SEP 25 1973  3,761,722

INVENTOR.
DONALD T. GREEN
BY Watts, Hoffmann,
Fisher & Heinke
ATTORNEYS.

INVENTOR.
DONALD T. GREEN
BY Watts, Hoffmann, Fisher & Heinke
ATTORNEYS.

TIRE INSPECTION APPARATUS

BACKGROUND OF THE INVENTION

1. Field of the Invention

The present invention relates to X-ray inspection and more particularly relates to a system for inspecting tires by the use of X-rays.

2. The Prior Art

The prior art has proposed X-ray inspection or examination apparatus employing wide-angle X-ray tubes, i.e. tubes which emit X-rays throughout a substantial angle about an axis of a target electrode in the tube. Some X-ray tubes have been produced which emit X-rays radially in a plane in all directions from the target electrode; that is, the X-rays were emitted 360° about an axis extending through the target electrode.

Wide-angle tubes were proposed for use in inspecting or examining objects which were constructed so that a number of X-ray exposures might be required if a tube which emitted a relatively narrow beam of X-rays were employed. An example of the possible use of a wide-angle tube is X-ray tire inspection equipment where some tires could not be completely inspected by use of narrow beam tubes without repositioning them during the inspection procedure. The use of wide-angle tubes permitted complete inspection of a tire without necessitating repositioning during the inspection process.

Because of the wide angle throughout which the X-rays were emitted scattering, or reflection of the X-rays from surrounding structures, tended to adversely affect images or other X-rays transparency information obtained when an object was penetrated by the X-rays. The effect of scatter radiation on X-ray transparency images was generally a reduction in the resolution of the image caused by the scattered X-rays impinging randomly on the imaging apparatus. In some environments the effects of X-ray scattering were significant enough to reduce the reliability of the inspection or examination.

Another problem encountered by the prior art was that of insufficient adjustability or manipulatability of X-ray tubes. In tire inspecting X-ray apparatus the X-ray tubes and their supports were required to be sufficiently manipulatable to allow for on and off loading of tires without interference with the X-ray tubes. The tube supports also had to provide for movement of the X-ray tubes into close proximity with tires positioned in the apparatus.

Tires of widely varying sizes have been inspected by such apparatus. Hence, extremely large tires required the X-ray tube supporting apparatus to be readily movable through relatively great distances to enable on and off loading of large tires. Extremely small tires, for example lawnmower tires, have such small rim diameters that the tube supporting apparatus tended to interfere with positioning the tubes where desired within the rim of the tire.

SUMMARY OF THE INVENTION

The present invention provides a new X-ray inspection or examination system employing a wide-angle X-ray tube and which is constructed and arranged so that the effects of scatter radiation on X-ray transparency images or other inspection information produced by penetration of an object inspected by X-rays are minimized, and wherein the X-ray tube is readily manipulated for positioning at relatively inaccessible locations without interference between the tube supporting structure and the object being inspected.

In one preferred embodiment of the invention, a tire inspecting system is provided which includes a tire manipulator, an X-ray tube and tube supporting assembly, and an X-ray imaging system. The tire manipulator accepts tires of most sizes, is horizontally movable, provides for vertical adjustment of the tire position and rotates the tire about its axis for inspection.

The X-ray imaging system provides an image intensifier which is orbitally movable about a generally vertical axis and is adjustably movable radially relative to the vertical axis. This permits the image intensifier of the imaging system to be moved as desired about a tire being inspected.

The X-ray tube supporting assembly supports a wide-angle X-ray tube in a tube housing. The supporting assembly provides for vertical and horizontal movement of the X-ray tube housing whereby the tube supporting assembly enables the X-ray tube and housing to be adjustably positioned to correspond to different adjusted positions of the tire manipulator as required by the size of the tire being inspected. The X-ray tube housing can also be cleared from the tire manipulator during on and off loading of tires.

The preferred X-ray tube supporting assembly includes a base, a support assembly which is vertically adjustable relative to the base and a horizontal support member which projects from the vertical support toward the tire manipulator. The horizontal support member is movable relative to the vertical support for horizontal adjusting movement as well as for rotation about the horizontal longitudinal axis of the horizontal support member. The X-ray tube and its housing are supported at the projecting end of the horizontal support member. The horizontal support member preferably carries electric power and coolant conduits for the X-ray tube and associated devices.

The X-ray tube housing is a two-part housing having one housing member attached to the end of the horizontal support. The second housing member is a tubular generally L-shaped member which supports the X-ray tube in one of its legs. The other leg is connected to the first housing member for rotation about an axis which is transverse to the horizontal support member and the second housing member is adjustable to substantially coextend with the horizontal projecting support member. When the second tube housing member and the horizontal projecting member coextend the X-ray tube can be moved into the rim of a small tire without interference between the rim and the tube support member or the housing. When the second tube housing member is adjusted to extend perpendicularly to the horizontal support member, the X-ray tube can be moved into the torous of a tire without interference between the tube support and the rim of the tire.

The X-ray tube is a wide-angle tube but scattering is minimized because the tube housing is constructed and arranged so that relatively narrow beams of X-rays are emitted by the tube. The direction of these X-ray beams is controllable so that the advantages of the use of the wide-angle tube are retained while undesirable scattering is minimized.

In a preferred construction, the tube housing includes a window member disposed about a target electrode of the X-ray tube. The window member provides an X-ray absorbing wall extending about the tube which absorbs X-rays. A window or X-ray transparent aperture is defined in the wall. Some X-rays emitted from the target electrode pass through the window in a beam while the remainder are absorbed by the wall of the window member. Images or other X-ray transparency information concerning the tire are thus substantially unaffected by scattering.

The beam emanating from the tube is directed toward desired locations on a tire. In a preferred embodiment of the invention the window member is rotatably supported about the tube. A drive motor is attached to the tube housing and is operable to rotate the window member relative to the tube so that the beam of X-rays passing through the window sweeps about the tube. The drive motor is preferably a reversible motor which can be intermittantly energized to sweep the beam about the tube in a stepwise fashion, if desired.

By coordinating movement of the image intensifier of the imaging system and the window member of the tube housing, complete inspection of a tire on the tire manipulator is facilitated without requiring repositioning of the tire or the X-ray tube during the inspection procedure.

One principal object of the present invention is the provision of a new and improved X-ray inspection or examination apparatus employing a wide-angle X-ray tube which is constructed and arranged so that X-rays which penetrate an object being inspected or examined are confined to a relatively narrow beam which scans the object so that the effects of scattering on X-ray transparency information concerning the object are minimized.

Another object of the invention is the provision of a new and improved X-ray inspection or examination apparatus for tires in which an X-ray tube is manipulatable relative to its support so that the tube can be inserted into the rim of a relatively small tire without interference between the rim and the tube support.

Other objects and advantages of the present invention will become apparent from the following detailed description made with reference to the accompanying drawings which form a part of the specification.

DESCRIPTION OF A PREFERRED EMBODIMENT

Figure 1:
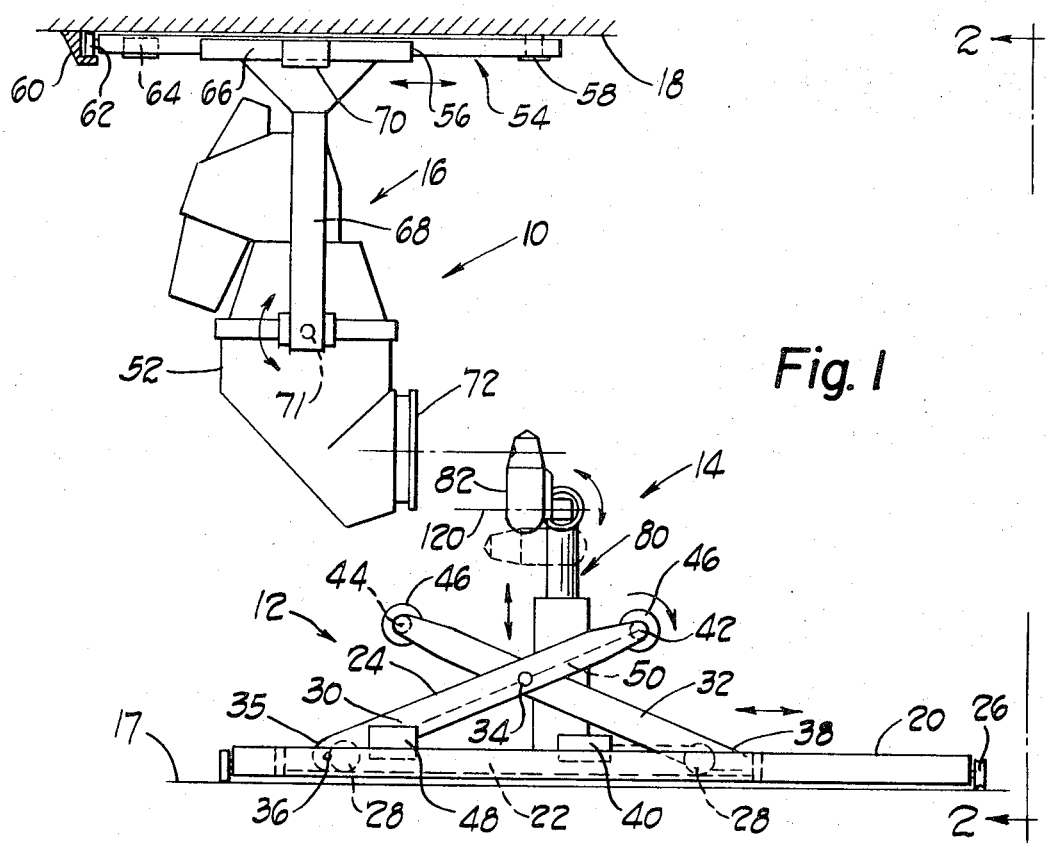
FIG. 1 is an elevational view of a tire inspection system embodying the present invention.
Figure 2:
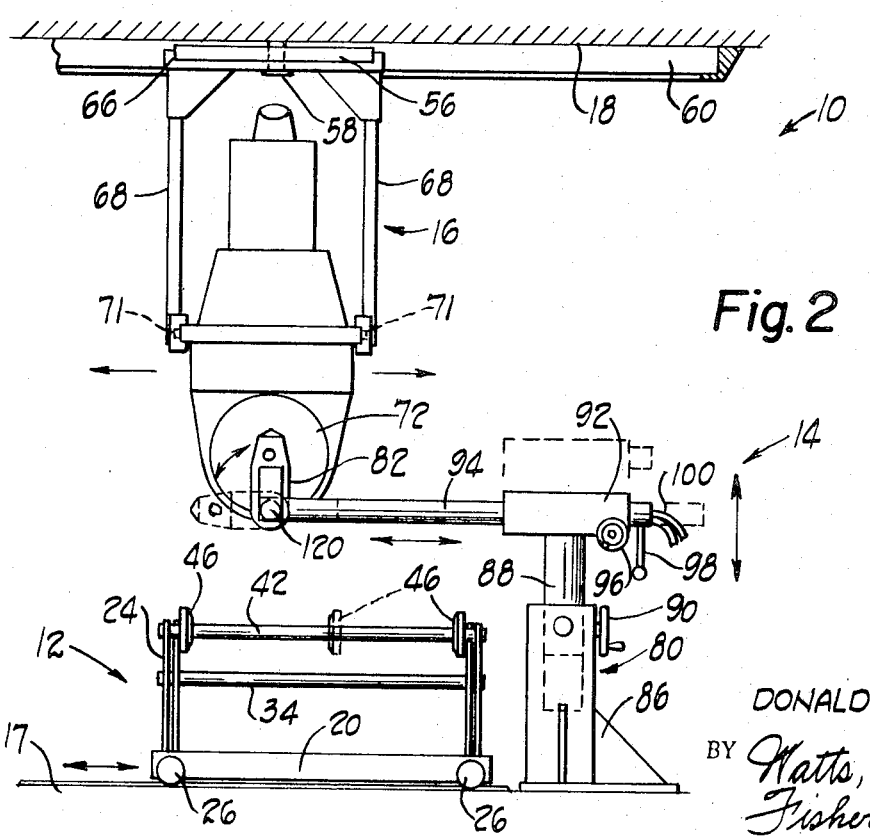
FIG. 2 is a view seen from the plane indicated by the line 2—2 of FIG. 1.

A tire inspection system 10 embodying the present invention is illustrated in FIGS. 1 and 2 of the drawings. The system 10 includes a tire supporting apparatus 12, an X-ray source apparatus 14 which is positioned adjacent the tire supporting apparatus 12 for directing X-rays through a tire supported by the apparatus 12, and an X-ray imaging apparatus 16 to which beams of X-rays are directed from the X-ray source apparatus through the tire being inspected. The illustrated system 10 defines an inspection station for tires which are supported on the apparatus 12 and is located in an inspection booth or enclosure having a floor 17 and a ceiling 18. The system 10 produces X-ray transparency images of a tire being inspected on a viewing screen located in an operator's control booth remote from the inspection station. The control booth and associated equipment can be of any suitable or conventional construction and therefore are not illustrated or described.

Figure 4:
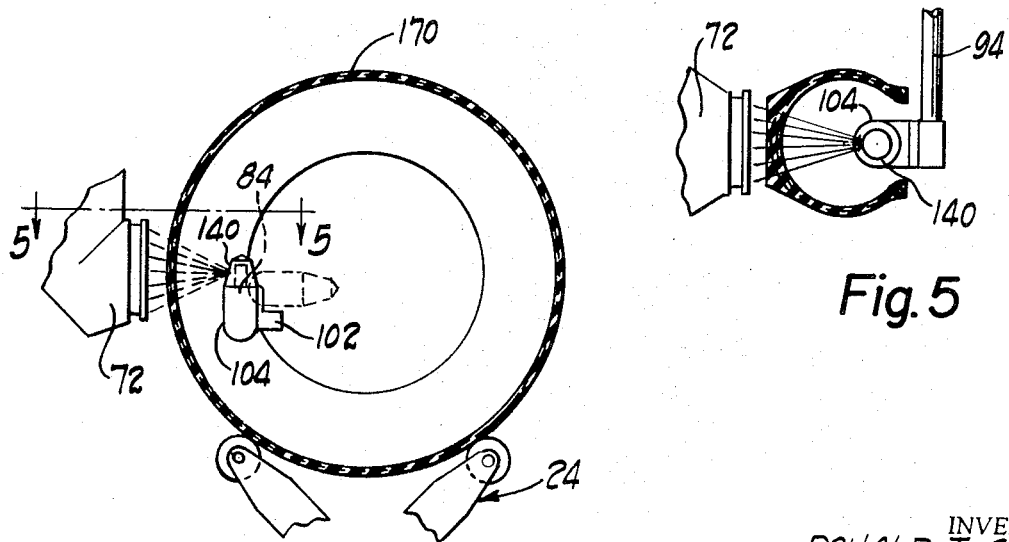
FIG. 4 is a vertical cross sectional view of a tire being inspected in the system illustrated in FIG. 1 with parts of the apparatus and a portion of the tire broken away; and, FIG. 5 is a cross sectional view seen from the plane indicated by the line 5—5 of FIG. 4.

The tire supporting apparatus 12 is constructed to provide for horizontal and vertical adjusting movement of a tire supported on it. Preferably tires are supported in an upright position with the tire axis extending horizontally as is shown in FIG. 4. The apparatus 12 also rotates the tire about its axis during inspection. The apparatus 12 includes a frameworklike base 20, a body 22 carried on the base 20 and a tire manipulator mechanism 24 supported by the body 22. The base 20 is supported on the floor 17 by wheels 26 which enable the base 20 to move horizontally towards and away from the X-ray source apparatus 14 in the direction of extent of the tire axis. The body 22 is supported on the base 20 by wheels 28 which enable the body to move horizontally along the base transverse to the direction of movement of the base. The body 22 is thus positionable relative to the X-ray source apparatus 14 where desired in a horizontal plane. Horizontal positioning of the apparatus 12 can be accomplished manually or by actuators which are not shown.

The tire manipulator mechanism 24 is preferably a scissors lift type mechanism which accommodates tires of various sizes and which enables adjustment of the elevation of a tire on the manipulator. The manipulator 24 includes first and second pairs of legs 30, 32, respectively. The legs 30, 32 are interconnected by a pivot pin 34 which extends laterally between the pairs of legs as is best seen in FIG. 2. The lower ends 35 of the legs 30 are pivoted to the body 22 along a pivot axis generally designated at 36 in FIG. 1 of the drawings. The lower ends 38 of the legs 32 are each slidable on and rotatable with respect to the body 22. The leg ends 38 are connected to the body 22 so that they cannot be moved vertically from the body in response to downwardly directed forces applied to the upper ends of the legs 32. An actuator 40 is connected to the lower ends 38 of the legs 32 for sliding the ends 38 horizontally along the body 22. When the lower ends 38 of the legs 32 are moved horizontally along the body 22, the elevation of the upper ends of the legs 30, 32 changes as the angularity between the legs changes. Operation of the actuator 40 is controlled by the operator of the system.

Tire supporting shafts 42, 44 extend between the upper ends of the legs of each pair 30, 32, respectively. The shafts 42, 44 each carry collars 46 which are adjustably movable along the shafts to tightly engage opposite side walls of a tire supported on the shafts. The shafts 42, 44 are rotatable relative to their respective associated legs so that a tire supported on the apparatus 12 can be rotated about its axis. The tire is rotated by operation of a motor 48 and drive transmission 50 supported on the body 22 and connected to the shaft 42. As is schematicallly illustrated in FIG. 1, the motor 48 drives the shaft 42 so that the tire supported on the manipulator is rotated about its axis. The shaft 44 is freely rotatable with respect to the legs 32 so that it affords little resistance to rotation of the tire.

The X-ray imaging apparatus 16 comprises an imaging system 52 and an overhead supporting arrangement 54 enabling controlled movement of the imaging system 52 about the tire manipulator 24. The supporting arrangement 54 comprises a horizontally oriented frame 56 connected between an overhead vertical pivot pin 58 and a semicircular track 60 which is spaced from the pivot pin and has its center of curvature on the axis of the pivot pin. The pivot pin 58 and the track 60 are connected to the ceiling 18. The frame 56 carries wheels 62, only one of which is shown, and which engage a horizontal flange of the track 60. One of the wheels is driven by a motor 64 carried on the support frame. When the motor 64 operates, the frame 56 rotates in a horizontal plane about the axis of the pivot pin 58.

The imaging system 52 is connected to the frame 56 by a trolley 66 which is movable along the frame 56 between the pivot member 58 and the track 60. The trolley 66 carries a pair of depending arms 68 which support the imaging system 52 below the trolley. A motor 70 is supported on the trolley for positioning the trolley 66 where desired on the frame 56. The imaging system 52 is thus adjustably positionable radially relative to the vertical axis of the pivot pin 58.

In the illustrated construction, the system 52 is connected to the arms 68 by horizontal pivot pins 71 which enable pivoting of the system 52 in a vertical plane about the pivot pins as shown by arrows in FIG. 1. This arrangement is useful if it is desired to direct X-ray beams tangentially relative to the tire through the tread wall and to the imaging system. This type of inspection is sometimes referred to as "over the horizon" inspection and is useful in determining whether the plies are radially separated more than a tolerable amount.

The imaging system 52 may be a conventional, commercially available construction such as that sold under the trademark "Delcalix" by De Oude Delft, a Dutch company. The system 52 is therefore not described in detail except to point out that a fluorescent screen 72 forming a part of the system 52 is impinged on by X-rays which have passed through the wall of a tire being inspected and an image intensifier and a closed circuit television system, not illustrated, produce an image which is displayed on a cathode ray tube screen in the inspection booth.

The X-ray source apparatus 14 includes an X-ray tube support mechanism 80, an X-ray tube housing assembly 82 and an X-ray tube 84 (FIG. 3) which is supported by the housing assembly. The tube support mechanism 80 and the housing assembly 82 are constructed and arranged so that the X-ray tube can be manipulated into close proximity with a tire being inspected without interference between the tube support mechanism and the tire and also enables the tube 84 to be moved away from the manipulator 24 during on and off loading of tires.

The X-ray tube support mechanism 80 comprises a base 86 which is fixed to the floor 17. A vertical support member 88 is supported by the base 86 and is movable vertically relative to the base by actuation of a hand wheel 90 and associated gearing (not shown). The member 88 carries a guide housing 92 at its upper end which in turn supports a horizontally oriented elongated support member 94. The horizontal support member 94 projects from the guide housing 92 toward the manipulator 24. The tube housing assembly 82 is connected to the projecting end of the support member 94. The support member 94 is movable relative to the guide housing 92 in the direction of its longitudinal axis by rotation of a hand wheel 96 and associated gearing (not shown). The horizontal support member 94 can thus adjustably position the tube housing assembly 82 relative to a tire on the manipulator 24.

The member 94 is rotatable about its longitudinal axis relative to the guide housing to enable rotational adjustment of the X-ray tube housing relative to a tire on the manipulator 24. A handle 98 is attached to the support member 94 and by which the support member is rotated about its longitudinal axis relative to the guide housing 92. In the preferred construction rotation of the support member 94 is limited to about 180°.

The support member 94 is tubular and preferably supports and protects electrical and coolant conduits for the X-ray tube. The electrical and cooling conduits, generally indicated by the reference character 100 extend through the support member 94 from a control panel in the operator's booth to the tube housing 82.

Figure 3:
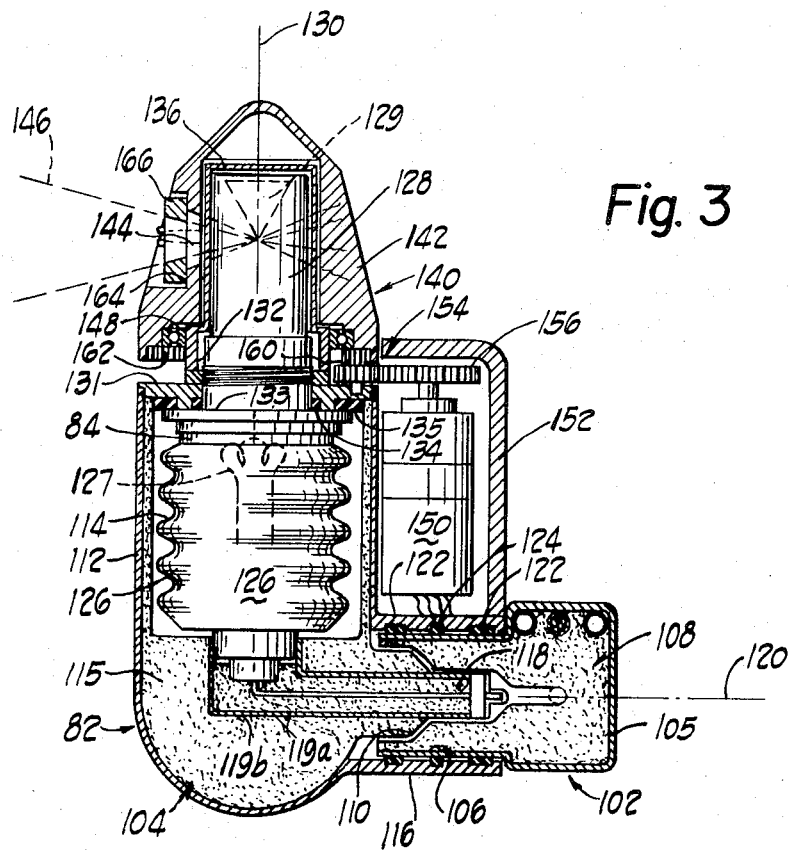
FIG. 3 is a cross sectional view of an X-ray tube and tube housing arrangement constructed according to the present invention.

The tube housing assembly 82 enables further manipulation of the X-ray tube 84 into close proximity with a tire on the manipulator 24 as well as enabling X-rays from the tube to be directed through a tire at desired locations. Referring now to FIG. 3, the tube housing assembly includes a first housing member 102 fixed to the projecting end of the horizontal support member 94 and a second housing member 104 supported by the first housing member 102. The housing member 104 carries the X-ray tube 84.

The second housing member 104 is adjustably movable relative to the first housing member 102 and the horizontal support 94 to permit adjustment of the position of the X-ray tube.

The housing member 102 includes a hollow body 105 which defines a tubular cylindrical projecting portion 106. The body 105 is filled with a suitable electrical insulating material indicated by the reference character 108 and defines a socket 110 in the projecting portion 106. The socket 110 is defined in part by electrically conductive parts, shown schematically, which are connected to electrical power conductors extending through the body 105.

The housing member 104 is a generally L-shaped tubular member having a first leg 112 which defines an X-ray tube socket 114 and a second leg 116 which extends about and is supported by the projecting portion 106. The housing member 104 contains a body of electrical insulating material 115 which surrounds electrical conductors extending to the tube socket 114. The material 115 defines an electrical plug connector 118 which extends into the socket 110. Electrical conductors 119a, 119b extend through the material 115 from the tube socket 114 to the plug 118. The plug 118 and socket 110 are engaged to provide electrical connections between the housing members enabling the X-ray tube 84 to be supplied with electrical power. In the preferred construction, a suitable dielectric fluid is confined in the housing members 102, 104 to supplement the effects of the solid electrical insulating material.

The housing member 104 is rotatable relative to the housing member 102 about an axis 120 extending transverse to the support member 94 so that the X-ray tube is adjustably movable in a plane extending generally parallel to the direction of extent of the member 94. The plug 118 and the socket 110 are of cylindric construction and have their centers located on the axis 120 so that the plug 118 is rotatable in the socket 110 without interrupting the electrical connection between them. Bearing members 122 are disposed between the cylindrical leg 116 and the projecting portion 106 and a fluid seal ring 124 is disposed axially between the bearings. The bearings 122 enable the housing member 104 to be manually rotated relative to the housing member 102. The housing member 104 is retained in adjusted positions by a suitable locking device which has not been shown. The locking device can take the form of a set screw acting between the members 102, 104 or it can be a detent arrangement if desired.

The X-ray tube 84 includes a ceramic body 126 supporting a cathode electrode 127, shown schematically. A cylindrical tube envelope member 128 containing a target electrode 129 projects from the ceramic body 126. In the illustrated construction the target electrode 129 is conical and defines a cone axis 130 extending coaxially with the housing leg 112. Electrons emitted by the cathode electrode strike the target electrode at the tip of the cone resulting in the emission of X-rays from the cone tip 360° about the axis 130 as is indicated by broken lines in FIG. 3.

The tube 84 is rigidly supported in and sealed to the housing member 104. The tube envelope member 128 projects through an annular plate 131 and a nut 132 which is threaded onto the tube envelope member. The body 126 carries an upper shoulder 133 which engages sealing rings 134, 135 disposed about the inner and outer peripheries of the plate 131. The tube 84 with the plate 131 and nut 132 assembled to it are inserted in the housing member 104. The outer periphery of the plate 131 is threaded as is the inner periphery of the open end of the housing member 104 so that the plate 131 is threaded into the housing to position the tube 84. The nut 132 is then tightened to draw the shoulder 133 into tight engagement with the plate 131 and the sealing rings 134, 135. This rigidly fixes the tube 84 to the plate 131 and housing member 104 while compressing the sealing rings to assure gas tight seals between the plate 131, the tube 84 and the housing member 104.

The tube envelope member 128 and the target electrode 129 thus project through the plate 131 from the housing member 104 along the axis 130. A cup-like member 136 is inverted over the envelope portion 128 and is sealed to the tube envelope portion adjacent the plate 131 to define a coolant jacket surrounding the tube envelope. Coolant supply and return lines, not shown, are connected to the member 136 so that cooling fluid circulates about the tube envelope. The member 136 is constructed from a material which is transparent to X-rays.

X-rays emanating from the tube 84 are confined to a relatively narrow beam which can be directed at desired locations on a tire being inspected. In the preferred and illustrated embodiment a window member 140 is disposed about the member 136 and the tube envelope portion 128. The window member 140 provides an X-ray absorbing wall 142 extending about the target electrode. The wall 142 defines an X-ray window or aperture 144. Some X-rays emitted by the electrode 129 freely pass through the window 144 and do so in a conical beam generally designated at 146 in FIG. 3. The remaining X-rays produced by the target electrode are absorbed in the wall 142.

The window member 140 is rotatable so that the X-ray beam passing through the window can be directed in desired directions from the tube. The window member 140 is supported on the member 136 by a bearing 148 so that the window member is freely rotatable about the axis 130 relative to the electrode 129. A motor 150 is attached to the housing member 104 by a bracket 152 and is drivingly connected to the window member 140 by gearing 154. The illustrated gearing includes a motor output gear 156, a pinion gear 160 supported by the plate 131 and a ring gear 162 attached to the internal periphery of the window member 140. The pinion gear is meshed with the output gear and the ring gear to transmit drive from the motor to the window member. The motor 150 is preferably a reversible electric motor which is controlled by the operator of the equipment from the control booth. The motor can be operated to continuously drive the wall member 140 about the tube or it can be energized intermittently to drive the wall member 140 stepwise about the tube.

The window member 140 is constructed to accommodate detachable collimators so that the size and shape of the X-ray beam directed from the tube can be varied. The X-ray window 144 is surrounded by a counter sunk shoulder 164 to which a suitable collimator 166 can be attached. The shoulder 164 is provided with tapped holes (not shown) so that the collimator 166 can be screwed in place on the shoulder 164. The collimator 166 is detachable so that it can be replaced by a different collimator to vary the size and/or configuration of the X-ray beam.

Figure 5:
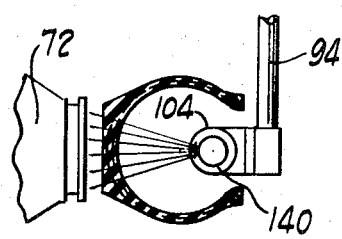

FIGS. 4 and 5 show the relationship between parts of the system 10 and a tire 170 supported on the manipulator 24 during inspection. As is shown in FIG. 4, the tire 170 is supported on the manipulator and the manipulator is moved horizontally to a location at which the tube housing assembly can be inserted in the tire rim. The horizontal support member is rotated so that the tube assembly is turned away from the tire rim, as is shown by the broken lines in FIG. 4, and the member 94 is advanced into the plane of the tire. The member 94 is then rotated to move the tube housing member 104 and the tube 84 between the tire sidewalls. The target electrode is then located within the torous defined by the tire (FIG. 5).

The imaging system is next adjusted so that the image intensifier is at a desired location adjacent the tire. The X-ray tube is energized and the window member 140 is rotated to direct a beam of X-rays through the tire wall to the image intensifier. The tire is rotated by the manipulator and the image intensifier 72 and the window member 140 are moved stepwise in a coordinated manner so that the tire is inspected from rim to rim without repositioning it. Because the X-rays which are emitted from the window member are confined to a relatively narrow beam scattering does not substantially effect the inspection image.

When small tires, such as those used on lawnmowers, are inspected the housing member 104 is rotated so that the axis 130 of the target electrode extends parallel to the support member 94. This adjustment, shown by broken lines in FIG. 2, enables the tube housing to extend into the rim of such a tire without interference between the member 94 and the tire rim. The tire is inspected by directing an X-ray beam generally radially through the tire to the image intensifier as the tire is rotated.

While a single embodiment of the invention has been illustrated and described in considerable detail the present invention is not to be considered limited to the precise construction shown. It is the intention to cover hereby all adaptations, modifications and uses of the invention which come within the scope of the appended claims.

What is claimed is:

1. In an x-ray inspection system for tires having side wall portions and a tread area extending between the side wall portions and wherein a manipulator supports a tire for rotation generally about its centerline and a radiation detecting means is disposed radially outwardly from the tread area, an x-ray inspection source apparatus comprising:
   a. an elongated support member having at least an end portion extending in a first direction laterally toward a tire on the manipulator;
   b. an x-ray tube housing assembly connected to said support member end portion;
   c. an x-ray tube supported by said x-ray tube housing; and,
   d. said x-ray tube housing assembly comprising:
      1. a tubular generally L-shaped housing member having a first housing leg portion defining a receptacle for said x-ray tube and a second housing leg portion extending toward said support member;
      2. said x-ray tube supported by said first leg portion along a first axis;
      3. means for connecting said second housing leg portion to said support member about a second axis extending generally transverse to said first axis and to the direction of extent of said support member; and,
      4. said connecting means enabling rotation of said x-ray tube with said first housing leg portion in a plane generally parallel to said direction of extent of said support member end portion to a position wherein said first axis extends generally parallel to the centerline of a tire on the manipulator and said x-ray tube and first housing leg portion project from said support member for insertion into the hub of a tire on the manipulator.

2. An x-ray source apparatus as claimed in claim 1 wherein said x-ray tube includes a target electrode configured to emit x-rays throughout a wide angle about said first axis and said housing assembly further comprises an x-ray absorbing wall member defining an x-ray abosrbing wall disposed partly about said target electrode and an x-ray transparent window in said wall enabling a beam of x-rays to pass from said apparatus, and actuating means for moving said window member relative to said x-ray tube about said first axis to shift the direction of said beam.

3. In a tire inspection apparatus for tires defining an axial centerline and having a wall extending about the centerline defining side wall portions including bead rims and a tread area between the side wall portions, the apparatus comprising:

a. tire manipulator means for supporting a tire for rotation substantially about its axial centerline;
   b. penetrative radiation source means for directing a beam of tire penetrating radiation through the tire from one bead rim of the tire to the other tire bead rim; and,
   c. radiation detection means for detecting penetrative radiation which has passed through the tire and producing inspection information;
   d. said radiation source means comprising:
      i. a housing supportable at least partly between said axial tire centerline and the tire tread area;
      ii. a radiation emitting member stationarily supported by said housing for emitting radiation throughout a wide angle about a radiation axis;
      iii. a window member rotatably supported by said housing for rotation about said radiation axis relative to said housing and said radiation emitting member, said window member comprising a radiation opaque material and having a radiation transparent window portion through which a portion of the radiation from the emitting member passes to provide a beam of penetrative radiation; and,
      iv. motor means for rotating said window member about said radiation axis to sweep said beam of penetrative radiation about said radiation axis through the tire to said detection means.

4. In a tire inspection apparatus as claimed in claim 3 further including support structure for said radiation source means which comprises a member extending generally parallel to said tire centerline and having a projecting end portion on which said source housing is supported, said source housing comprising a first tubular leg portion receiving said radiation emitting member with said radiation axis coextending with said first leg portion, and a second leg portion extending transverse to said radiation axis, said support structure further comprising connecting means between said projecting end portion and said second housing leg portion for enabling rotation of said housing about an axis extending transverse to said radiation axis so that said housing is movable to a position wherein said first housing leg portion and said radiation axis extend generally parallel to said tire centerline.

5. Apparatus as claimed in claim 3 wherein said radiation emitting member comprises an x-ray tube.

6. Apparatus as claimed in claim 5 wherein said window member is defined in part by a circumferential wall extending about said x-ray tube, said wall comprised of a material which absorbs x-rays emanating from said x-ray tube and wherein the x-ray transparent window is provided in said wall.

7. Apparatus as claimed in claim 6 wherein said motor means for said window member comprises an electric motor for rotating said window member relative to said x-ray tube whereby said x-ray beam sweeps about said tube as said window member rotates.

* * * * *